(No Model.)

T. McADON.
COMBINED STALK CUTTER AND RAKE.

No. 418,050. Patented Dec. 24, 1889.

Witnesses,
William S. Hodges.
Robert Jennings.

Inventor
Thomas McAdon,
By his Attorney
Patrick O'Farrell.

N. PETERS, Photo-Lithographer, Washington, D. C.

UNITED STATES PATENT OFFICE.

THOMAS McADON, OF LITTLE SIOUX, IOWA, ASSIGNOR OF ONE-HALF TO GILBERT SMITH, OF SAME PLACE.

COMBINED STALK CUTTER AND RAKE.

SPECIFICATION forming part of Letters Patent No. 418,050, dated December 24, 1889.

Application filed June 14, 1889. Serial No. 314,257. (No model.)

*To all whom it may concern:*

Be it known that I, THOMAS MCADON, a citizen of the United States of America, residing at Little Sioux, in the county of Harrison and State of Iowa, have invented certain new and useful Improvements in Combined Stalk Cutters and Rakes, of which the following is a specification, reference being had therein to the accompanying drawings.

This invention pertains to certain new and useful improvements in combined stalk cutters and rakes, having for its object the provision of new and improved means for simultaneously effecting the cutting of two rows of cornstalks and making the same, when cut, into windrows at suitable distances apart.

The invention comprises a sled carrying cutting-knives projecting from its sides, and a central gage-wheel, and a rake which is designed to revolve periodically, the same being held stationary in the meantime by a spring-pressed locking-bar engaging a stop-bar of the rake; and the invention further comprises the detail construction, combination, and arrangement of parts, substantially as hereinafter fully set forth, and particularly pointed out in the claims.

Figure 1:
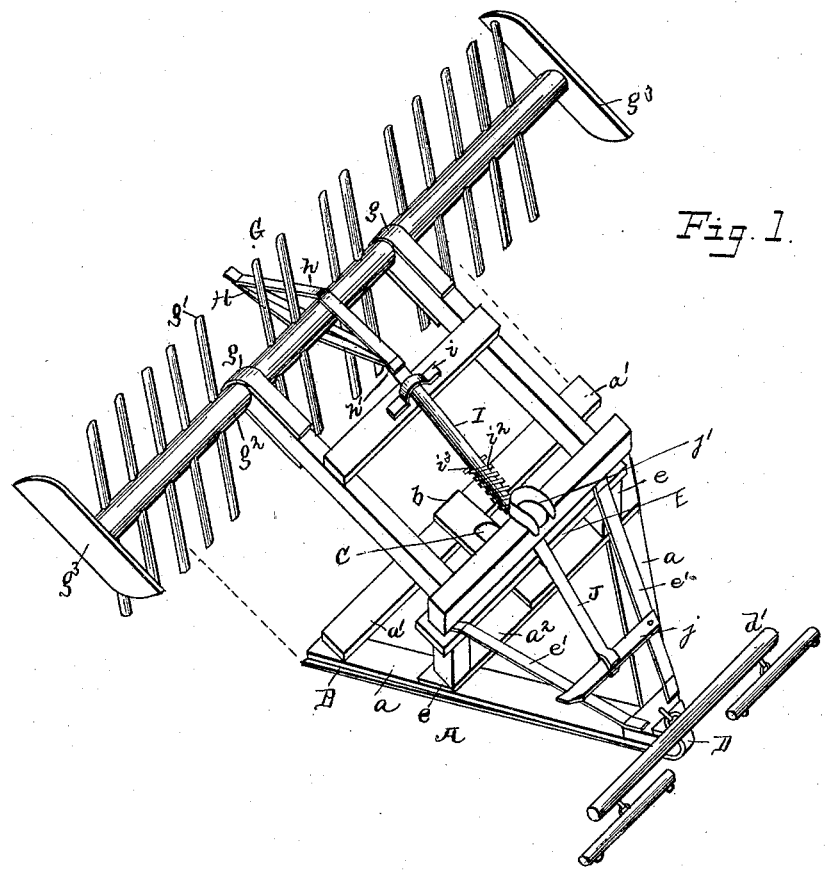
Figure 2:
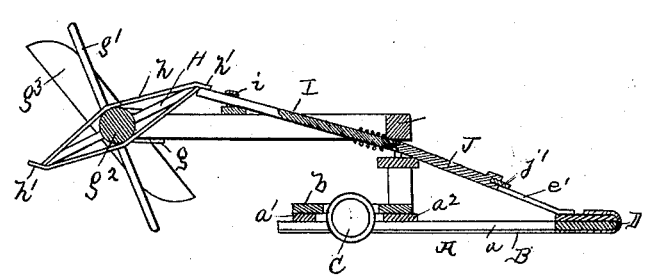

In the accompanying drawings, Figure 1 is a view in perspective of my improved stalk cutter and rake. Fig. 2 is a central longitudinal sectional view thereof.

Referring to the drawings, A designates a sled or runner composed of two divergent bars $a\ a$, united by cross-bars $a'\ a^2$.

B B are the knives or cutters secured to the under side of bars $a$, the extent of their protrusion being increased toward their rear ends.

C is a gage-wheel journaled between two bars $b\ b$, secured to cross-bars $a'\ a^2$. This wheel is designed to run midway between two rows and prevent lateral movement of the knives which come in contact with and effect the cutting of adjacent parallel rows of cornstalks.

To the front end of sled A is secured a curved nose-plate D, which serves to enable the sled to ride over or force aside any stones or other obstructions. To a goose-neck bar $d$, attached to this end of the sled, are secured three whiffletrees $d'$, to the central one of which the horse walking between the rows is attached. A bridge-piece E is held above cross-bar $a^2$ by two short posts $e\ e$, and the same is additionally secured in place by brace bars or straps $e'$, attached thereto and to the front end of the sled.

F is the rake-frame, which is pivotally connected by eyebolts $f\ f$ to the bridge of sled A. The rake G is connected to the rear ends of the side bars of frame F by strap-irons $g\ g$, passed around reduced circular portions thereof, so as to enable said rake to revolve. Cross bars or tines $g'$ are passed through apertures of bar $g^2$ of the rake, and to the ends of said bar end boards $g^3$ are secured to prevent the cornstalks from falling off at the ends of the rake. A stop-bar H is secured to bar $g^2$, transversely to the bars or tines $g'$, and around it is preferably passed iron bars $h\ h$, having flared or flanged ends $h'$, as shown.

I is a locking-bar held by keeper-plates $i\ i'$, and around it is passed a coil-spring $i^2$, bearing against keeper-plates $i$ and a cross-pin $i^3$. This spring normally holds the locking-bar projected the full extent of its rearward movement, so that the stop-bar H will come in contact therewith and prevent the turning of the rake. To the forward end of this locking-bar I is pivotally secured one end of a pitman J, likewise secured at its forward end to a lever $j$, fulcrumed to one of the brace-bars $e'$.

The seat $j'$ for the driver or operator is secured to the forward end of the rake-frame F.

In practice the knives B will effect the cutting of the cornstalks close down to their roots, said knives being prevented from deflecting or moving laterally by the central gage-wheel. The rake is normally held as against turning by reason of contact of the stop-bar with the spring-held locking-bar, and thus the stalks as cut are raked until a sufficient quantity thereof has been secured to form a windrow, at which time the operator presses his foot on lever $j$, effecting the disengagement of the locking and stop bars and permitting the rake to revolve, causing the dumping of the stalks at that point. The operator immediately releases his pressure from the lever, allowing the locking-bar to fly into the path of the stop-bar, and the latter in coming in contact therewith will again hold the rake as against turning.

I claim as my invention—

1. The herein-described combined cornstalk cutter and rake comprising the sled having divergent side bars, the knives secured along the edges of said side bars, the revoluble rake secured to said sled in rear of said knives, and the spring-pressed bar engaging said rake, substantially as set forth.

2. The combination of the sled having the divergent side bars, the knives secured along the edges thereof, the rake-frame pivotally secured to said sled, the revoluble rake journaled in said frame and having a central lateral stop-bar, the spring-pressed stop-bar secured to said rake-frame and designed to engage said lateral bar, the foot-lever, and the pitman connected thereto and to said locking-bar, substantially as set forth.

3. The herein-described combined cornstalk cutter and rake, comprising the sled having divergent side bars, the knives secured along the edges of said side bars, the revoluble rake secured to said sled in rear of said knives, the spring-pressed bar engaging said rake, and the central gage-wheel midway between said knives, beneath which it is designed to project, substantially as set forth.

In testimony whereof I affix my signature in presence of two witnesses.

THOMAS McADON.

Witnesses:
   JOHN ROSS,
   L. F. STOCKWELL.